(12) United States Patent
Meisinger et al.

(10) Patent No.: US 11,101,641 B2
(45) Date of Patent: Aug. 24, 2021

(54) FAULT PROTECTION DEVICES AND RELATED RECLOSING METHODS

(71) Applicant: S&C Electric Company, Chicago, IL (US)

(72) Inventors: Michael John Meisinger, Chicago, IL (US); David Francis Klein, Glenview, IL (US)

(73) Assignee: S&C Electric Company, Chicago, IL (US)

( * ) Notice: Subject to any disclaimer, the term of this patent is extended or adjusted under 35 U.S.C. 154(b) by 257 days.

(21) Appl. No.: 16/562,478

(22) Filed: Sep. 6, 2019

(65) Prior Publication Data
US 2020/0099217 A1     Mar. 26, 2020

Related U.S. Application Data

(60) Provisional application No. 62/735,577, filed on Sep. 24, 2018.

(51) Int. Cl.
    *H02H 7/22*             (2006.01)
    *H02H 1/00*             (2006.01)

(52) U.S. Cl.
    CPC ............ *H02H 7/22* (2013.01); *H02H 1/0007* (2013.01)

(58) Field of Classification Search
    CPC ........ H01H 75/04; H01H 9/54; H02H 11/005; H02H 3/006; H02H 3/021; H02H 3/025;
(Continued)

(56) References Cited

U.S. PATENT DOCUMENTS 6,667,866 B1 * 12/2003 LaPlace ................. H02H 3/063
                                                              361/42
7,626,397 B2 * 12/2009 Opfer ..................... H01H 75/04
                                                              324/509
(Continued)

FOREIGN PATENT DOCUMENTS

WO        2015/082632 A1      6/2015

OTHER PUBLICATIONS

International Search Report and Written Opinion for International Application No. PCT/US2019/051415 dated Dec. 3, 2019. (10 pages).

*Primary Examiner* — Jared Fureman
*Assistant Examiner* — Nicolas Bellido (57) ABSTRACT

Fault protection devices for electrical distribution systems and related reclosing methods are provided. One exemplary method of reclosing a switching element of a fault protection device after fault detection involves pulsing the switching element closed to enable a temporary current flow through the fault protection device and verifying absence of a fault condition based at least in part on the temporary current flow using a testing fault detection threshold. After verifying the absence of the fault condition, the method closes the switching element to enable current flow through the fault protection device, monitors the current flow through the fault protection device for the fault condition using the testing fault detection threshold for a transition period, and monitors the current flow through the fault protection device for the fault condition using a different fault detection threshold after the transition period.

26 Claims, 4 Drawing Sheets

(58) Field of Classification Search
CPC ............ H02H 3/027; H02H 3/05; H02H 3/06;
H02H 3/063; H02H 3/066; H02H 3/07;
H02H 3/08; H02H 3/093; H02H 3/0935;
H02H 7/26; H02H 7/30; H04B 3/54
See application file for complete search history.

(56) References Cited

U.S. PATENT DOCUMENTS

| | | |
|---|---|---|
| 8,270,136 B2 | 9/2012 | Vincente et al. |
| 8,279,567 B2 | 10/2012 | Bengtsson et al. |
| 2012/0327545 A1* | 12/2012 | Witte ................... H02H 7/262 361/92 |
| 2013/0070378 A1* | 3/2013 | Witte ................... H01H 83/12 361/71 |
| 2017/0294275 A1* | 10/2017 | Spence .................. H01H 9/54 |

* cited by examiner

FAULT PROTECTION DEVICES AND RELATED RECLOSING METHODS

CROSS-REFERENCE TO RELATED APPLICATION

This application claims the benefit of priority from the U.S. Provisional Application No. 62/735,577, filed on Sep. 24, 2018, the disclosure of which is hereby expressly incorporated herein by reference for all purposes.

TECHNICAL FIELD

The subject matter described herein relates generally to electrical distribution systems, and more particularly, to improved fault protection upon reclosing.

BACKGROUND

Distribution faults that may result in outages or equipment damage are a significant concern for electric power utilities. Many distribution faults are temporary in nature, and therefore, reclosers or reclosing circuit breakers are often utilized to detect and temporarily interrupt fault currents to clear faults and avoid sustained outages. However, if a fault persists, reclosing contributes to system reliability issues by re-exposing the distribution system to the fault current, potentially multiple times before the recloser locks out and prevents any further downstream current flow. This can cause damage to splices, jumpers, and other distribution equipment, while also subjecting substation transformers to excess current, which, in turn, may result in mechanical stress that increases wear and decreases longevity. Some fault interruption devices utilize fault testing capability, including pulse testing capability, in connection with reclosing to limit the potential fault current while testing to determine whether the fault persists.

There are a number of distribution faults that pose unique challenges for system operators. For example, low-current faults or other faults that evolve over time may go undetected by one or more fault protection devices, depending on the particular location of the fault with respect to the protection device. In such scenarios, reclosing a downstream fault protection device could re-expose upstream equipment to potentially damaging fault current as the fault evolves or result in one or more upstream fault protection devices locking out, resulting in a sustained outage having a larger scope than if the fault were isolated by a downstream protection device. Accordingly, it is desirable to provide improved fault protection devices and methods that further improve system reliability and mitigate the effects of fault conditions. Furthermore, other desirable features and characteristics of the present invention will become apparent from the subsequent detailed description and the appended claims, taken in conjunction with the accompanying drawings and the foregoing technical field and background.

BRIEF SUMMARY

Fault protection devices and related electrical systems and operating methods are provided. An exemplary method of operating a fault protection device involves a control module of the fault protection device monitoring current flow through the fault protection device for a fault condition using a first fault detection threshold, operating a switching element of the fault protection device to disable the current flow in response to detecting the fault condition using the first fault detection threshold, and thereafter operating the switching element to enable a subsequent current flow through the fault protection device and monitoring the subsequent current flow through the fault protection device using a second fault detection threshold for a transition period. The second fault detection threshold is different from the first fault detection threshold. In exemplary embodiments, the second fault detection threshold is more sensitive than the first fault detection threshold.

In another embodiment, a fault protection device is provided. The fault protection device includes a first interface, a second interface, a switching element electrically in series between the first interface and the second interface, a current sensing arrangement to measure current flow between the first interface and the second interface, and a control module coupled to the current sensing arrangement and the switching element to obtain measurements of the current flow from the current sensing arrangement, detect a fault condition based on the measurements of the current flow using a first fault detection threshold, operate the switching element to disable the current flow in response to detecting the fault condition, thereafter operate the switching element to enable a subsequent current flow, and monitor the subsequent current flow through the fault protection device using a testing fault detection threshold for a transition period.

In yet another embodiment, a method of reclosing a switching element of a fault protection device after fault detection involves generating a current pulse, for example by pulsing the switching element closed to enable a temporary current flow, through the fault protection device and verifying an absence of a fault condition based at least in part on the temporary current flow using a testing fault detection threshold. After verifying the absence of the fault condition, the method closes the switching element to enable current flow through the fault protection device, monitors the current flow through the fault protection device for the fault condition using the testing fault detection threshold for a transition period, and monitors the current flow through the fault protection device for the fault condition using a different fault detection threshold after the transition period.

In another embodiment, an electrical distribution system is provided. The electrical distribution system includes a first fault protection device coupled to a portion of an electrical grid and a second fault protection device coupled to the portion of the electrical grid. The first fault protection device and the second fault protection device disable current flow in response to detecting a fault condition on the electrical grid using a first fault detection threshold. While the second fault protection device is open, the first fault protection device is configured to allow a temporary current flow through the first fault protection device to test for the fault condition, verify an absence of the fault condition based at least in part on the temporary current flow and a testing fault detection threshold, enable a subsequent current flow through the first fault protection device in response to verifying the absence of the fault condition, and monitor the subsequent current flow using the testing fault detection threshold during a transition period that elapses prior to the second fault protection device allowing a second temporary current flow through the second fault protection device to test for the fault condition.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Embodiments of the subject matter described herein relate to operating fault protection devices in an electrical energy distribution system to mitigate the impact of fault conditions, and more particularly, fault conditions that evolve over time, exhibit low-current, or may otherwise be difficult to detect upon initial reclosing. As described in greater detail below, current flow through a fault protection device is initially monitored for a fault condition using a normal or default fault detection threshold while a switching element of the fault protection device is closed to enable current flow. After initially detecting a fault condition, the switching element of the fault protection device is opened to disable current flow in an attempt to isolate the fault condition. Thereafter, after some pre-testing delay period, the switching element tests for whether the fault condition persists within the distribution system. In exemplary embodiments, the switching element generates a pulse of current, for example, the switching element is pulsed closed to allow a temporary current flow through the fault protection device, which may be analyzed in concert with the voltage signals measured at the fault protection device to determine whether the fault condition still persists. In alternative embodiments, the switching device may incorporate solid state elements or other current generating structure to generate the pulse of current. A modified testing fault detection threshold having a greater sensitivity than the normal fault detection threshold is utilized when analyzing the current flow after reclosing the switching device to determine if the fault condition persists. In this regard, the testing fault detection threshold may have time current or impedance characteristics that result in a fault condition being detected in a shorter amount of time and/or at a lower current level than would be detected using the time current or impedance characteristics associated with the normal fault detection threshold. Thus, fault conditions that evolve or otherwise exhibit a lower current than that which initially caused the fault protection device to detect a fault condition may be identified by using the more sensitive testing fault detection threshold. For example, a fault current resulting from a tree or other wooden material contacting electrical distribution lines downstream of a fault protection device may temporarily fluctuate as the wood carbonizes and/or the amount of contact with the electrical distribution line(s) varies.

After pulsing the switching element closed or otherwise testing via the switching element and identifying an absence of the fault condition using the testing fault detection threshold, the switching element is closed to resume current flow through the fault protection device. For an initial transition period after closing the switching element, the current flow through the fault protection device is continually monitored for a fault condition using the modified testing fault detection threshold. In this regard, the modified testing fault detection threshold allows for fault conditions that evolve after initially reclosing the switching element to be detected faster or earlier by the fault protection device, thereby allowing the fault protection device to isolate the fault condition before components upstream of the fault protection device are affected. In the absence of detecting a fault condition during the transition period, once the transition period has elapsed, the fault protection device reverts to monitoring for a subsequent fault condition using the normal or default fault detection threshold. As described in greater detail below, the transition period may be configured or otherwise coordinated relative to the pre-testing delay period for downstream fault protection devices to maximize the duration of time that the more sensitive fault detection threshold is utilized after reclosing while also ensuring the fault detection threshold reverts to the normal level before a downstream fault protection device begins testing and reclosing to prevent fault conditions downstream of a downstream fault protection device from tripping or otherwise triggering the upstream fault protection device.

Figure 1:
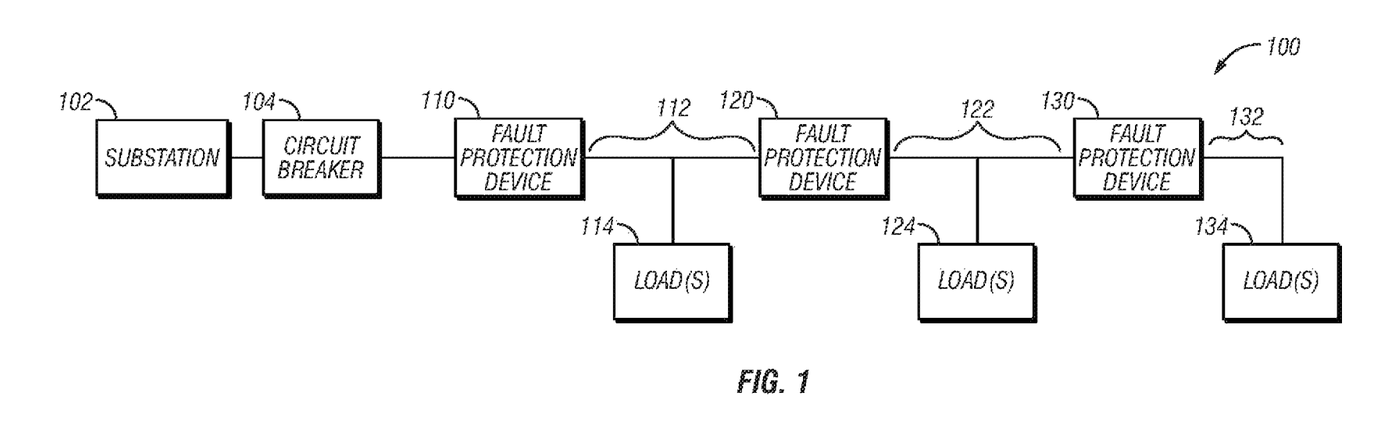
FIG. 1 is a block diagram of an electrical distribution system in one or more exemplary embodiments.

FIG. 1 depicts an exemplary embodiment of an electrical distribution system 100 including a plurality of fault protection devices 110, 120, 130 capable of selectively isolating different portions 112, 122, 132 of an electrical grid from an adjacent or interconnecting portion of the grid in response to a fault condition or other anomaly. The different portions 112, 122, 132 of the electrical grid generally represents the distribution lines (or feeders), transformers, and other electrical components that provide an electrical interconnection enable current flow between an electrical power source 102 and electrical loads 114, 124, 134 connected to different portions of the grid. The electrical loads 114, 124, 134 generally represent any devices, systems, components or appliances that receive electrical power from the electrical grid for operation, such as, for example, one or more computer systems or other computing equipment (e.g., computers, servers, databases, networking components, or the like), medical equipment or devices, household appliances, and/or the like. It should be understood that FIG. 1 is a simplified representation of an electrical distribution system 100 for purposes of explanation and is not intended to be limiting.

In the illustrated embodiment, the electrical power source 102 is realized as an electrical substation that transforms or otherwise converts electrical energy from an upstream generator of electrical energy to an appropriate voltage level suitable for distribution and/or consumption by the downstream components. It should be appreciated that the subject matter described herein is not intended to be limited to any particular type, number, arrangement, or configuration for upstream electrical power source(s) that are capable of being isolated or otherwise protected by the fault protection devices 110, 120, 130. In the illustrated embodiment, a circuit breaker or similar overcurrent or impedance protection device 104 is configured electrically in series between the substation 102 and downstream portions of the electrical grid to protect one or more component(s) of the substation 102 from potentially damaging downstream currents.

The fault protection devices 110, 120, 130 are configured to automatically prevent current flow between portions of the electrical grid interconnected by the respective fault protection device 110, 120, 130 in response to detecting a fault condition or other anomalous condition with respect to the current flow through the respective fault protection device 110, 120, 130. As described in greater detail below in the context of FIGS. 2-3, in exemplary embodiments, the fault protection devices 110, 120, 130 automatically attempt to re-enable current flow (or reclose) after preventing current flow for a period of time in response to initially detecting a fault condition. In exemplary embodiments, the fault protection devices 110, 120,130 utilize pulsed-closing to monitor for a persistent fault condition using a modified testing fault detection threshold that is more sensitive than the fault detection threshold that was used to detect the fault condition initially. In the absence of re-detecting the fault condition using the modified testing fault detection threshold during a transition period, the fault protection devices 110, 120,130 revert to monitoring for subsequent fault conditions using the normal fault detection threshold. In exemplary embodiments, the fault detection thresholds utilized by the fault protection devices 110, 120, 130 are designed or otherwise configured to interrupt current flow prior to the circuit breaker 104 interrupting current flow.

In one or more embodiments, the fault protection devices 110, 120, 130 are networked or otherwise communicatively coupled to one another to facilitate communications between the fault protection devices 110, 120, 130. In such embodiments, a fault protection device 110, 120, 130 may communicate to an adjacent fault protection device 110, 120, 130 information characterizing the current state of the fault protection device 110, 120, 130, including, for example, indication of whether the fault protection device 110, 120, 130 is currently sensing fault current flow, enabling or preventing current flow, indication of the current fault detection threshold being utilized by the fault protection device 110, 120, 130, the duration of delay periods, transition periods, or other timers being implemented by the fault protection device 110, 120, 130, and/or the like. In this regard, the state information from adjacent fault protection device(s) 110, 120, 130 may be utilized to configure a respective fault protection device 110, 120, 130 to ensure pulsed-closing or reclosing of one fault protection device 110, 120, 130 does not cause another fault protection device 110, 120, 130 to erroneously detect a fault condition (i.e., a false positive).

Figure 2:
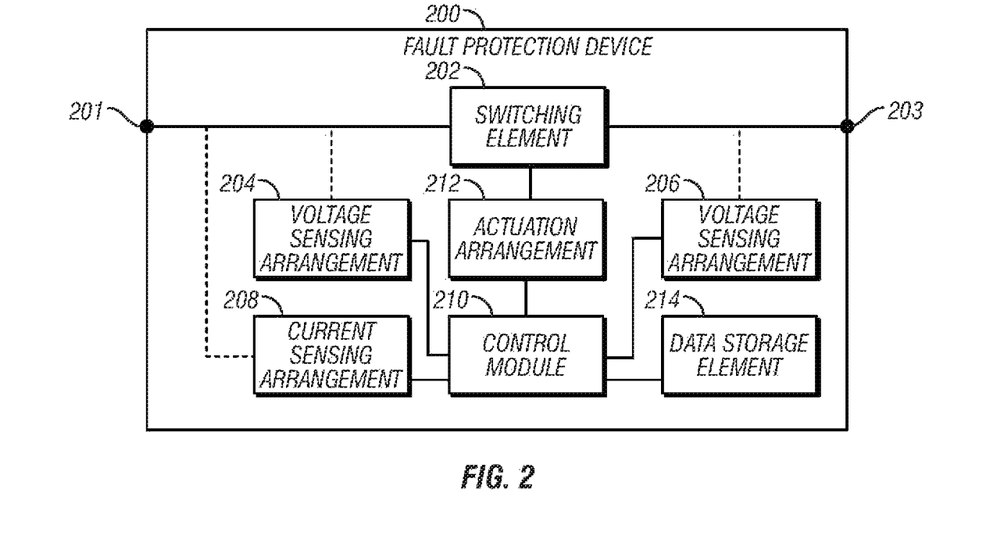
FIG. 2 is a block diagram of a fault protection device suitable use in the electrical distribution system of FIG. 1 in accordance with one or more exemplary embodiments.

FIG. 2 depicts an exemplary embodiment of a fault protection device 200 suitable for use as the fault protection devices 110, 120, 130 in the electrical distribution system 100 of FIG. 1. The fault protection device 200 includes, without limitation, a switching element 202 configured electrically in series between two input/output (I/O) interfaces 201, 203 of the fault protection device 200, voltage sensing arrangements 204, 206 coupled to the respective I/O interfaces 201, 203, a current sensing arrangement 208 configured to measure a current flow between the I/O interfaces 201, 203, and a control module 210 coupled to an actuation arrangement 212 for the switching element 202. The control module 210 is coupled to the sensing arrangements 204, 206, 208 and detects or otherwise identifies a potential fault condition based on current flow and its relationship to the measured voltage(s) (if present) associated with the I/O interface(s) 201, 203 of the fault protection device 200. In response to detecting a fault condition, the control module 210 commands, instructs, signals, or otherwise operates the actuation arrangement 212 to thereby actuate and maintain the switching element 202 in an opened state to prevent current flow between the I/O interfaces 201, 203.

The I/O interfaces 201, 203 generally represent the respective terminals, connectors, taps, or other physical interface to the fault protection device 200 that supports establishing a conductive electrical connection with the wiring or other corresponding interface to the portion of the electrical grid adjacent to the fault protection device 200 within an electrical distribution system. For purposes of explanation and without limitation, the first I/O interface 201 may alternatively be referred to herein as the input interface or upstream interface and the second I/O interface 203 may alternatively be referred to herein as the output interface or downstream interface. That said, it should be appreciated that the fault protection device 200 is not unidirectional in operation and may be employed in various different configurations where I/O interface 203 could be effectively upstream of the I/O interface 201 or neither I/O interface 201, 203 is upstream of the other (e.g., where a substation or other electrical power source is present on each side of the fault protection device 200, the relevant portion of the electrical grid has a ring-like configuration, etc.).

In the illustrated embodiment, the first voltage sensing arrangement 204 is coupled to the upstream interface 201 to measure the voltage difference between the upstream interface 201 and a stored reference value. Similarly, the second voltage sensing arrangement 206 is coupled to the downstream interface 203 to measure the voltage difference between the downstream interface 203 and the stored reference value. In exemplary embodiments, the voltage sensing arrangements 204, 206 are realized as coupled capacitive voltage sensors; however, it should be appreciated that the subject matter described herein is not limited to any particular type of voltage sensing arrangement or voltage sensing technique. Additionally, it should be noted that in some embodiments, voltage sensing arrangements 204, 206 may not be present and the subject matter may be implemented without requiring voltage measurements at the interfaces 201, 203. In one or more exemplary embodiments, the current sensing arrangement 208 includes one or more transformers or other circuit elements arranged in series between the interfaces 201, 203 and configured to transform, scale, or otherwise convert the current flow between interfaces 201, 203 to a signal level that is suitable for measuring by the control module 210.

In exemplary embodiments, the switching element 202 is realized as a vacuum interrupter including an electrical contact that is movable or otherwise actuatable by the actuation arrangement 212 relative to a fixed electrical contact to selectively enable or disable current flow through the electrical contacts. The subject matter described herein is not limited to any particular type of switching element 202. In exemplary embodiments, the actuation arrangement 212 is realized as a magnetic actuation arrangement that is operable by the control module 210 to alternate the polarity of a magnetic field exposed to a magnetic element or material provided on the movable electrical contact of the switching element 202 to displace the movable electrical contact from one extent of its range of motion to the other extent of its range of motion. For example, to close the switching element 202 and enable current flow, the control module 210 may provide a signal to the actuation arrangement 212 that results in a magnetic field that forces or otherwise displaces the movable electrical contact of the switching element 202 into physical contact with the other electrical contact to enable current flow through the electrical contacts. Conversely, to open the switching element 202 and disable current flow, another signal may be provided to the actuation arrangement 212 that reverses the magnetic field to force or otherwise attract the movable electrical contact away from the fixed electrical contact to interrupt and disable current flow. The subject matter described herein is not limited to any particular type of actuation arrangement 212 for operating the switching element 202.

Depending on the embodiment, the control module 210 may be implemented or realized with a processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, and configured to carry out the functions, techniques, and processing tasks associated with the operation of the fault protection device 200 described in greater detail below. Furthermore, the steps of a method or algorithm described in connection with the embodiments disclosed herein may be embodied directly in hardware, in firmware, in a software module executed by the control module 210, or in any practical combination thereof. In accordance with one or more embodiments, the control module 210 includes or otherwise accesses a data storage element 214, which may be realized as any sort of memory (e.g., RAM memory, ROM memory, flash memory, registers, a hard disk, or the like) or other suitable non-transitory short or long term storage media capable of storing computer-executable programming instructions or other data for execution that, when read and executed by the control module 210, cause the control module 210 to execute, facilitate, or perform one or more of the processes, tasks, operations, and/or functions described herein.

In exemplary embodiments, the data storage element 214 stores or otherwise maintains values or data that characterize or otherwise define the different fault detection thresholds to be implemented by the fault protection device 200 along with values or data that characterize or otherwise define the different time periods that are utilized by the fault protection device 200 for purposes of automatically reclosing the switching element 202, as described in greater detail below. In some embodiments, the various fault detection thresholds, delay time periods, transition time periods, and other reclosing criteria to be utilized by the fault protection device 200 may be user-configurable or otherwise modifiable by a user. For example, in embodiments where the fault protection device 200 is coupled to a communications network, a remote device may be utilized by a user to configure and upload fault detection and reclosing criteria to the control module 210 for storage in the data storage element 214 via the communications network. In other embodiments, a user interface device may be coupled to the fault protection device 200 and/or the control module 210 to support user modifications to the fault detection and/or reclosing criteria maintained in the data storage element 214. In yet other embodiments, where the fault protection device 200 is communicatively coupled to one or more other instances of fault protection devices 200, the fault detection and/or reclosing criteria to be utilized by the fault protection device 200 may be dynamically determined based on the fault detection criteria, the reclosing criteria, and/or the current state of other instances of fault protection devices 200 to avoid potentially erroneous fault detection or other false positives.

Figure 3:
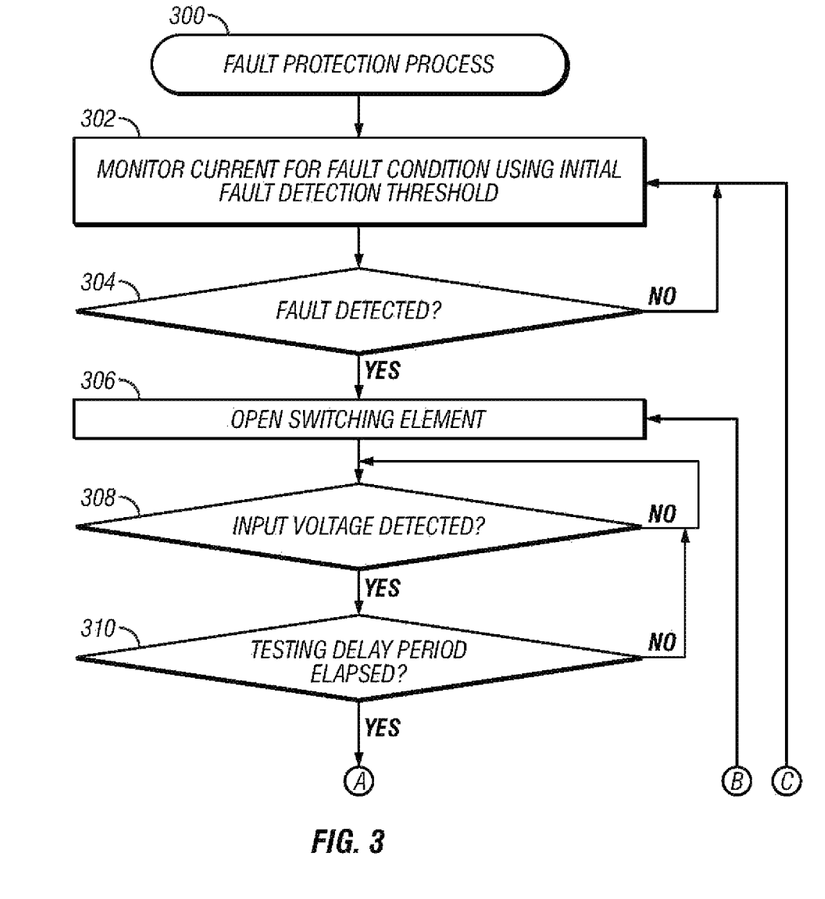
FIG. 3 is a flow chart of a fault protection process suitable for use with the fault protection device of FIG. 2 in one or more exemplary embodiments.

FIG. 3 depicts an exemplary embodiment of a fault protection process 300 suitable for implementation by a fault protection device 110, 120, 130, 200 to detect faults or other anomalous conditions and automatically disable and then re-enable current flow in an autonomous manner. The various tasks performed in connection with the illustrated process 300 may be implemented using hardware, firmware, software executed by processing circuitry, or any combination thereof. For illustrative purposes, the following description may refer to elements mentioned above in connection with FIGS. 1-2. In practice, portions of the fault protection process 300 may be performed by different elements of the fault protection device 110, 120, 130, 200. It should be appreciated that the fault protection process 300 may include any number of additional or alternative tasks, the tasks need not be performed in the illustrated order and/or the tasks may be performed concurrently, and/or the fault protection process 300 may be incorporated into a more comprehensive procedure or process having additional functionality not described in detail herein. Moreover, one or more of the tasks shown and described in the context of FIG. 3 could be omitted from a practical embodiment of the fault protection process 300 as long as the intended overall functionality remains intact.

Referring to FIG. 3 with continued reference to FIGS. 1-2, the illustrated embodiment of the fault protection process 300 initializes or otherwise begins by monitoring current flow through the fault protection device using an initial fault detection threshold to detect or otherwise identify a potential fault condition (tasks 302, 304). In response to detecting a potential fault condition, the fault protection process 300 opens, deactivates, or otherwise operates the switching element to prevent current flow through the fault protection device (task 306). In exemplary embodiments, the control module 210 is configured to continually analyze current and voltage measurement values from the current and voltage sensing arrangements 204, 206, 208 to detect or otherwise identify when the magnitude of the current flow between the interfaces 201, 203 or the impedance measured by control module 210 exceeds a threshold current or impedance value for a duration of time that exceeds a threshold duration of time associated with the respective threshold current or impedance value. In this regard, the control module 210 may implement a normal or default time-current characteristic curve or impedance characteristic defined for the respective fault protection device 200 and detect potential fault conditions in accordance with that time-current characteristic curve or impedance characteristic. For example, the data storage element 214 may store or otherwise maintain values, data, or other information defining the time-current curve or impedance characteristic to be implemented by the fault protection device 200 during normal operation. When the magnitude of the measured current flow through the fault protection device 200 exceeds a threshold duration of time associated with that level of current flow defined by the normal time-current or impedance fault detection threshold for the fault protection device 200, the control module 210 detects a potential fault condition. In response to the potential fault condition, the control module 210 commands, signals, or otherwise operates the actuation arrangement 212 to actuate the switching element 202 from a closed state to an open state where current flow is prevented. For example, in the case of a vacuum interrupter, the control module 210 operates the actuation arrangement 212 to separate or otherwise disengage the electrical contacts of the switching element 202, resulting in a separation distance between the electrical contacts that prevents current flow between the interfaces 201, 203.

After opening the switching element, the fault protection process 300 monitors one or more interfaces of the fault protection device to detect an input voltage to the fault protection device, and in response to detecting an input voltage, waiting for a testing delay period before initiating testing for persistence of the fault condition (tasks 308, 310). Based on the measured voltage(s) at the interfaces 201, 203 obtained from the voltage sensing arrangement(s) 204, 206, the control module 210 verifies or otherwise confirms that the fault protection device 200 is electrically connected at least a portion of the electrical grid that is receiving power from an energy source prior to testing for persistence of the fault condition (e.g., to avoid false negatives). Once the control module 210 determines that the fault protection device 200 is receiving input electrical power at one of the interfaces 201, 203, the control module 210 initiates a timer to wait for a testing delay period before performing pulse testing or other testing for persistence of the fault condition. In this regard, the testing delay period is configured to help avoid false negatives while also allowing one or more upstream fault protection devices to revert to their normal fault detection threshold(s) prior the fault protection device 200 testing for the fault condition. As described above, the value dictating the duration for the testing delay period may be user configurable and stored in the data storage element 214 for reference by the control module 210 when configuring and implementing the testing delay period timer.

It should be noted that in some embodiments, a fault protection device 110, 120, 130, 200 may be implemented without any voltage sensing arrangements 204, 206, in which case the testing delay period timer may simply be automatically initiated upon opening the switching element 202. In such embodiments, the delay periods for the different fault protection devices 110, 120, 130 may be staggered or otherwise offset with respect to one another to allow for an adjacent fault protection device 110, 120, 130 to complete the fault protection process 300 (e.g., the testing delay period for one fault protection device is greater than or equal to the sum of the testing delay period and transition period for the adjacent downstream device) before performing fault testing or otherwise reclosing.

Figure 4:
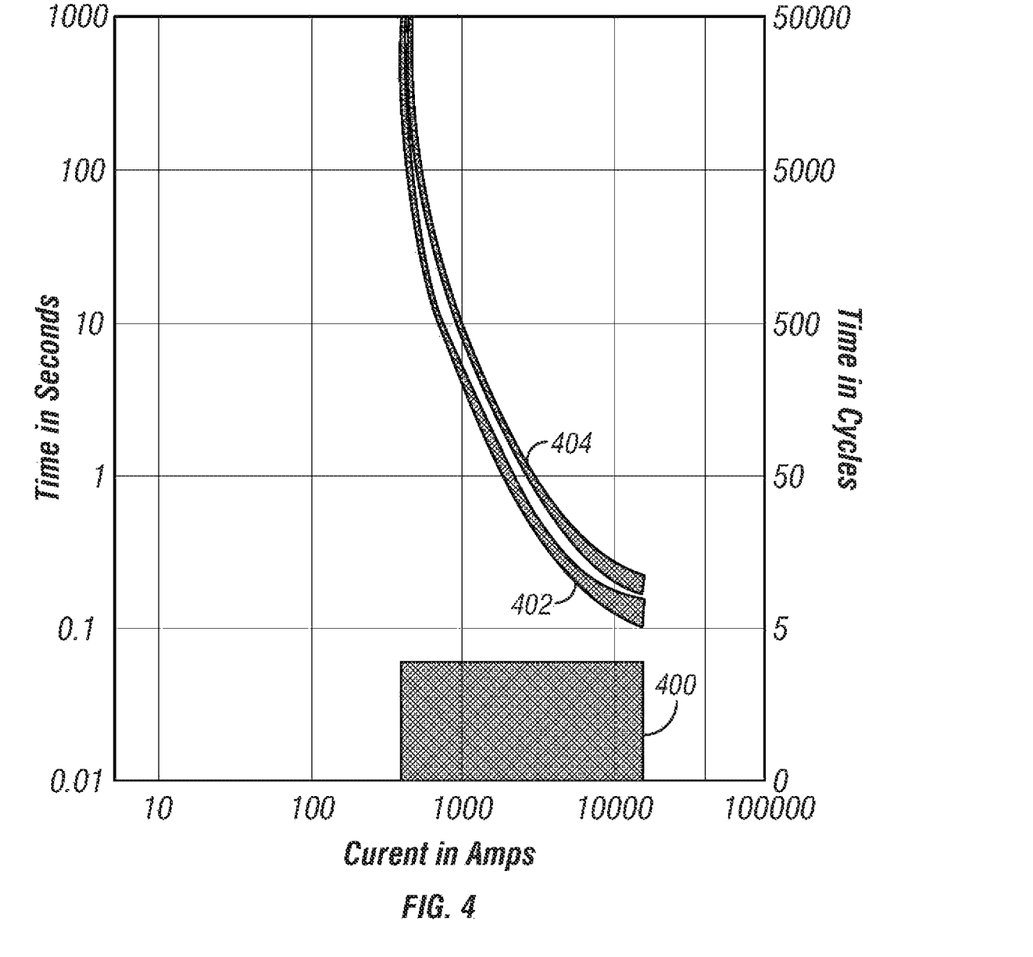
FIG. 4 is a graph of exemplary time-current characteristic curves suitable for use with a fault protection device in conjunction with the fault protection process of FIG. 3 in accordance with one or more exemplary embodiments.

After the testing delay period has elapsed and testing results in an indication the absence of the fault, the switching element closes and the fault protection process 300 monitors current flow through the fault protection device to verify absence of the fault condition using a testing fault detection threshold that is less than the initial fault detection threshold used prior to opening the switching element to initially detect the potential fault condition (tasks 312, 314). In this regard, the testing fault detection threshold is more sensitive than the normal fault detection threshold utilized by the fault protection device 200 to enable detection of low current faults or other evolving fault conditions that could otherwise go undetected during pulsed-closing of the switching element 202 if the normal fault detection threshold were used. For example, FIG. 4 depicts an example of a testing time-current characteristic curve 400 that may be utilized by the fault protection device 200 during a testing period relative to another less sensitive testing time-current characteristic curve 402 that may be utilized as the normal or default fault detection threshold for the fault protection device 200. Another slower or less sensitive testing time-current characteristic curve 404 may be utilized by an upstream device, such as a circuit breaker 104 or a further upstream instance of the fault protection device 200, as described in greater detail below. As described above, the data storage element 214 may store or otherwise maintain values, data, or other information defining the testing time-current characteristic curve to be implemented by the fault protection device 200 during the testing time period. In some embodiments, the control module 210 may calculate a modified testing time-current characteristic curve based on the normal time-current characteristic curve defined for the fault protection device 200 by scaling the normal time-current characteristic curve using a scaling factor that increases sensitivity.

Referring again to FIG. 3 with continued reference to FIGS. 1-2 and 4, to test for the fault condition, the control module 210 commands, signals, or otherwise operates the actuation arrangement 212 to temporarily close the switching element 202 for a limited duration of time and thereby enable a temporary current flow through the fault protection device 200. During the fault testing of the switching element 202, the control module 210 monitors the relationship between the measured current obtained via the current sensing arrangement 208 and the measured voltage(s) by the voltage sensing arrangement(s) 204, 206 to detect or otherwise identify presence of the fault condition based on the power factor associated with the temporary current flow. In one or more embodiments, the control module 210 pulses the switching element 202 closed at or around a voltage peak for the measured input voltage at a respective interface 201, 203 to minimize the magnitude of the current flow through the fault protection device 200 in the event of a short-circuit fault condition. Additionally, the control module 210 concurrently monitors the temporary current flow to detect or otherwise identify persistence of the fault condition using the testing fault detection threshold. When the magnitude of the temporary current flow through the fault protection device 200 violates the testing fault detection threshold, the control module 210 detects persistence of the fault condition.

After verifying the absence of detecting a fault condition during the pulsed-closing of the switching element, the fault protection process 300 closes the switching element to re-enable continuous current flow through the fault protection device while continually monitoring for a potential fault condition using the testing fault detection threshold until a transition period of time has elapsed since initially closing the switching element (tasks 316, 318, 320). In this regard, the control module 210 operates the actuation arrangement 212 to place the switching element 202 in a closed state where the electrical contacts of the switching element 202 are engaged with one another to enable a continuous current flow between the interfaces 201, 203. The control module 210 initiates a timer to wait for a transition delay period before reverting to the original fault detection threshold for the fault protection device 200. During the transition delay period, when the magnitude of the measured current flow through the fault protection device 200 exceeds a threshold duration of time associated with that level of current flow defined by the testing time-current fault detection threshold for the fault protection device 200, the control module 210 detects persistence of the fault condition and commands, signals, or otherwise operates the actuation arrangement 212 to open the switching element 202.

In exemplary embodiments, the testing delay period is configured to enable detection of low current or other evolving fault conditions using the testing time-current characteristic curve 400 before reverting to the normal time-current characteristic curve 402. Additionally, the testing delay period allows for a more sensitive fault detection threshold to be utilized while waiting for another downstream fault protection device to begin fault testing and reclosing. In this regard, in exemplary embodiments, the transition period is less than or equal to the testing delay period for an adjacent fault protection device to allow the fault protection device 200 to revert to the normal fault detection threshold before the adjacent fault protection device begins fault testing to avoid the fault protection device 200 erroneously detecting a fault condition in response to a current flow that is attributable to the fault testing being performed by the adjacent fault protection device. As described above, the value dictating the duration for the transition delay period may be user configurable and stored in the data storage element 214 for reference by the control module 210 when configuring and implementing the transition delay period timer.

In one or more exemplary embodiments, when a fault condition is detected during fault testing or subsequent transition period, the fault protection process 300 determines whether a number of attempts at automatically reclosing the switching element 202 after initially detecting a fault condition exceeds a threshold value. In this regard, in some embodiments, each time a fault condition is detected prior to the transition period elapsing, a counter implemented by the control module 210 is incremented to monitor or otherwise track the number of reclosing attempts. When the number of reclosing attempts reaches a maximum number of allowable closing attempts, the control module 210 may terminate or otherwise disable the fault protection process 300 and maintain the switching element 202 in an open state, which may alternatively be referred to as "lockout," "locked out," or variants thereof. Conversely, in the absence of detecting a fault condition during fault testing or subsequent transition period, the fault protection process 300 reverts to monitoring the current flow using the original fault detection threshold at the end of the transition period (task 302).

Referring to FIG. 1 with reference to FIGS. 2-4, in exemplary embodiments, the fault protection process 300 is implemented or otherwise performed by each of the fault protection devices 110, 120, 130 in the electrical distribution system 100 to isolate fault conditions within the electrical grid from the upstream components 102, 104. For example, the circuit breaker 104 may be configured to detect fault conditions using a time-current characteristic curve 404 that is less sensitive than the normal time-current characteristic curve 402 utilized by the fault protection device 110, 120, 130 to provide time for the fault protection devices 110, 120, 130 to detect and isolate fault conditions prior to the circuit breaker 104 opening in an attempt to minimize the number of customers (e.g., represented by electrical loads 114, 124, 134) affected by an outage resulting from a fault condition. In this regard, when each of the fault protection devices 110, 120, 130 utilize the same normal time-current characteristic curve 402, a fault condition on the furthest downstream portion 132 of the electrical grid results in each of the fault protection devices 110, 120, 130 detecting the fault condition and opening to isolate the fault from the circuit breaker 104 (e.g., tasks 302, 304, 306).

After each of the fault protection devices 110, 120, 130 have opened, the upstream interface 201 of the furthest upstream fault protection device 110 receives an input voltage from the substation 102, which, results in the upstream fault protection device 110 initiating a delay timer before performing testing via switching element 202 (e.g., tasks 308, 310). After the delay period, the switching element 202 of the fault protection device 110 tests to detect whether there is a persistent downstream fault condition using a testing fault detection threshold (e.g., tasks 312, 314). In the absence of a persistent fault condition, the switching element 202 of the fault protection device 110 is maintained closed while current flow through the fault protection device 110 is continually monitored for potential recurrence of the fault condition using the modified testing time-current characteristic curve 400 instead of the normal time-current characteristic curve 402 for a transition period (e.g., tasks 314, 316, 318, 320). Since the adjacent downstream fault protection device 120 is opened and the fault condition does not exist on the intervening grid portion 112, the fault protection device 110 identifies the absence of a persistent fault condition and its switching element 202 remains closed resulting in continued current flow to the loads 114 connected to the adjacent grid portion 112 (e.g., task 316). Reclosing the switching element 202 results in the fault protection device 110 initiating its transition period timer (e.g., task 318), and furthermore, results in the upstream interface 201 of the adjacent fault protection device 120 detecting an input voltage and initiating its testing delay timer (e.g., tasks 308, 310). As described above, in exemplary embodiments, the duration for the transition period timer implemented by the upstream fault protection device 110 is less than the duration for the testing delay timer implemented by the adjacent fault protection device 120 so that the upstream fault protection device 110 reverts to monitoring current flow using the normal time-current characteristic curve 402 before the adjacent fault protection device 120 begins fault testing.

After the upstream fault protection device 110 reverts to its original time-current characteristic curve 402, after the testing delay period, the switching element 202 of the adjacent fault protection device 120 tests to detect whether there is a downstream fault condition. Testing by the fault protection device 120 verifies or otherwise detects the absence of the fault because the downstream fault protection device 130 is open, and then the fault protection device 120 recloses its switching element 202 for continued monitoring using the modified testing time-current characteristic curve 400 (e.g., tasks 312, 314). By virtue of the upstream fault protection device 110 restoring its fault detection threshold to a higher or less sensitive level and the downstream fault protection device 130 being open, the reclosing of the switching element 202 of the fault protection device 120 to reenable current flow to the loads 124 connected to the adjacent grid portion 122 does not result in the upstream fault protection device 110 erroneously detecting a fault condition. Here, it should be noted that by virtue of the testing time-current characteristic curve 400 utilized by the fault protection device 120 being more sensitive than the normal time-current characteristic curve 402 utilized by the upstream fault protection device 110, if a low current or evolving fault condition were to exist on the adjacent downstream grid portion 122 and go undetected during the initial fault testing, the fault protection device 120 may open its switching element 202 during the transition period prior to upstream fault protection device 110 tripping.

When the fault protection device 120 initiates its transition period timer upon reclosing its switching element 202, this also results in the upstream interface 201 of the next downstream fault protection device 130 detecting an input voltage and initiating its testing delay timer (e.g., tasks 308, 310). After fault protection device 120 reverts to its original time-current characteristic curve 402 and after the testing delay period, the switching element 202 of the downstream fault protection device 130 tests to detect whether there is a downstream fault condition. In this regard, in some embodiments, the fault protection device 130 may detect persistence of the fault condition on the downstream grid portion 132 and maintain its switching element 202 in its opened state, thereby isolating the fault condition and allowing continuous current flow to be restored to the upstream grid portions 112, 122 and loads 114, 124. However, some low current fault conditions or other evolving fault conditions could initially go undetected during the testing, and in which case the fault protection device 130 may reclose its switching element 202 using the modified testing time-current characteristic curve 400 (e.g., tasks 312, 314) to enable current flow to the downstream grid portion 132 and loads 134 (e.g., task 316). That said, by virtue of the fault protection device 130 continuing to monitor current flow using the more sensitive testing fault detection threshold (e.g., curve 400), evolution of the fault condition on the downstream grid portion 132 may result in the fault protection device 130 detecting the fault condition and re-opening its switching element 202 prior to any of the upstream fault protection devices 110, 120 detecting the fault condition, thereby maintaining current flow to the upstream grid portions 112, 122 and loads 114, 124. Thereafter, the fault protection device 130 may make one or more subsequent attempts to automatically reclose before locking out and maintaining isolation of the grid portion 132 exhibiting the fault condition.

It should be noted that in embodiments where the fault protection devices 110, 120, 130 are networked and capable of communicating with one another, the fault protection devices 110, 120, 130 may communicate to coordinate fault detection thresholds or timer durations to achieve a desired configuration of fault protection devices 110, 120, 130. For example, upon reclosing of a downstream fault protection device, an upstream fault protection device may be notified to allow the upstream fault protection device to reconfigure its fault detection threshold to achieve staggered or tiered fault detection thresholds across the fault protection devices (e.g., to achieve a configuration where each of the fault protection devices 110, 120, 130 utilizes a different fault detection threshold). In this regard, the fault protection device 110 may utilize an intermediate time-current characteristic curve 402 upon reclosing after the testing and transition period where the testing time-current characteristic curve 400 was utilized, before reverting to a less sensitive time-current characteristic curve 404 after the transition period associated with the intermediate fault protection device 120 elapses and/or upon reclosing of the downstream fault protection device 130. In this regard, there are numerous potential configurations of fault detection thresholds that may be utilized across sets of fault protection devices, and the subject matter described herein is not intended to be limited to any particular arrangement of fault detection thresholds or any particular manner of coordinating or configuring such thresholds. Similarly, different fault protection devices 110, 120, 130 may be configured to use different testing delay periods or transition periods, which, in turn, may be communicated to adjacent fault protection devices 110, 120, 130 to enable such adjacent fault protection devices 110, 120, 130 to dynamically modify or otherwise adjust their respective timers to achieve the desired staggering and restoration of fault detection thresholds relative to one another in accordance with the fault protection process 300. Again, the subject matter described herein is not intended to be limited to any particular arrangement of timers or any particular manner of coordinating or configuring timers across fault protection devices.

By virtue of the modified testing fault detection threshold and the testing delay and transition periods, the fault protection process 300 may prevent unnecessary lockout of one or more upstream fault protection devices. For example, if an evolving fault condition existed on the furthest downstream grid portion 132, and the fault protection devices 110, 120, 130 utilized the same fault detection thresholds without the modified testing fault detection threshold and the testing delay and transition periods described above, each of the fault protection devices 110, 120, 130 may reclose before the fault current is sufficient to enable redetection by the fault protection devices 110, 120, 130, which, in turn, results in the fault protection devices 110, 120, 130 reopening, thereby undesirably disrupting restoration of current flow to loads 114, 124 upstream of the fault. Furthermore, in some instances, one or more of the further upstream fault protection devices 110, 120 could lockout, worsening the impact on upstream loads 114, 124 that could have otherwise been isolated by the downstream fault protection device 130. In more extreme scenarios, the fault condition could evolve in a way that results in fault current having sufficient magnitude to trip the upstream circuit breaker 104, thereby prolonging the impact on a larger number of grid portions and loads, or the fault condition could otherwise subject the components of the substation 102 to undesirable stress that degrades or impairs their longevity or performance. Thus, the subject matter described herein achieves improved fault isolation by improved detection of fault conditions that could otherwise go undetected, while also reducing the likelihood of lockout or other impacts on other electrically-connected fault protection devices.

It should be noted that the subject matter described herein is not intended to be limited to pulse-based fault detection or testing schemes (e.g., "pulse closing," "pulse finding," or the like) or time-current characteristic based fault detection, and the subject matter may be implemented in an equivalent manner using any number of different techniques or methods for identifying the absence or presence of a fault condition. For example, in some embodiments, the switching element may simply be reclosed after the testing delay period without any intervening fault testing, with persistence or absence of the fault condition being detected solely based on the relationship between the resulting measured current and the testing fault detection threshold. In various embodiments, impedance-based fault detection (e.g., the relationship between the measured voltage and the measured current corresponds to an impedance that is less than a fault detection threshold impedance), power-based fault detection (e.g., the measured power is greater than a fault detection threshold value), frequency-based fault detection (e.g., the frequency of the measured current is less than a reference frequency value, the difference between the frequency of the measured current and the reference frequency value is greater than a fault detection threshold, etc.), sensitive earth fault detection, neutral unbalance fault detection, sequence components, or another mathematical analysis technique may be utilized to detect presence of a fault current. Accordingly, the subject matter described herein is not limited to any particular technique or manner for detecting a fault condition.

For the sake of brevity, conventional techniques related to electrical energy generation and distribution, overcurrent protection, fault detection, time-current curves, impedance characteristics, switching, signaling, sensing, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The foregoing description may refer to elements or components or features being "coupled" together. As used herein, unless expressly stated otherwise, "coupled" means that one element/node/feature is directly or indirectly joined to (or directly or indirectly communicates with) another element/node/feature, and not necessarily mechanically.

Thus, although the drawings may depict one exemplary arrangement of elements with direct electrical connections, additional intervening elements, devices, features, or components may be present in an embodiment of the depicted subject matter. In addition, certain terminology may also be used in the following description for the purpose of reference only, and thus are not intended to be limiting. For example, the terms "first," "second," and other such numerical terms referring to structures do not imply a sequence or order unless clearly indicated by the context.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of operating a fault protection device, the method comprising:
    monitoring, by a control module of the fault protection device, current flow through the fault protection device for a fault condition using a first fault detection threshold;
    operating, by the control module, a switching element of the fault protection device to disable the current flow in response to detecting the fault condition using the first fault detection threshold; and
    thereafter:
        operating, by the control module, the switching element to enable a subsequent current flow through the fault protection device; and
        monitoring, by the control module, the subsequent current flow through the fault protection device using a second fault detection threshold for a transition period, wherein the second fault detection threshold is different from the first fault detection threshold.

2. The method of claim 1, further comprising monitoring, by the control module, the subsequent current flow through the fault protection device using the first fault detection threshold after the transition period.

3. The method of claim 1, further comprising after detecting the fault condition, waiting for a testing delay period prior to operating the switching element to allow the subsequent current flow.

4. The method of claim 3, wherein a duration of the testing delay period is greater than a duration of the transition period.

5. The method of claim 1, further comprising operating, by the control module, the switching element to disable the subsequent current flow in response to detecting the fault condition using the second fault detection threshold after enabling the subsequent current flow.

6. The method of claim 1, wherein the first fault detection threshold comprises a normal time-current characteristic curve and the second fault detection threshold comprises a testing time-current characteristic curve.

7. The method of claim 1, wherein the second fault detection threshold is more sensitive than the first fault detection threshold.

8. The method of claim 1, further comprising, prior to operating the switching element to enable the subsequent current flow through the fault protection device:
    operating, by the control module, the switching element to allow a temporary current flow; and
    verifying, by the control module, an absence of the fault condition based at least in part on the temporary current flow, wherein operating the switching element to enable the subsequent current flow comprises operating the switching element to enable the subsequent current flow in response to verifying the absence of the fault condition.

9. The method of claim 8, the second fault detection threshold comprising a testing fault detection threshold, wherein identifying the absence of the fault condition comprises identifying the absence of the fault condition based at least in part on the temporary current flow using the second fault detection threshold.

10. The method of claim 8, wherein operating the switching element to allow the temporary current flow comprises the control module:
    monitoring a voltage at an interface to the fault protection device for a voltage peak; and
    pulsing the switching element closed for a limited duration of time around the voltage peak.

11. The method of claim 10, wherein identifying the absence of the fault condition comprises verifying the absence of the fault condition based at least in part on a first relationship between the temporary current flow and the voltage and a second relationship between the temporary current flow and the second fault detection threshold.

12. A computer-readable medium having computer-executable instructions stored thereon that, when executed by the control module of the fault protection device, cause the control module to perform the method of claim 1.

13. A fault protection device comprising:
    a first interface;
    a second interface;
    a switching element electrically in series between the first interface and the second interface;
    a current sensing arrangement to measure current flow between the first interface and the second interface; and
    a control module coupled to the current sensing arrangement and the switching element to obtain measurements of the current flow from the current sensing arrangement, detect a fault condition based on the measurements of the current flow using a first fault detection threshold, operate the switching element to disable the current flow in response to detecting the fault condition, thereafter operate the switching element to enable a subsequent current flow, and monitor the subsequent current flow through the fault protection device using a testing fault detection threshold for a transition period.

14. The fault protection device of claim 13, wherein the control module monitors the subsequent current flow through the fault protection device using the first fault detection threshold after the transition period.

15. The fault protection device of claim 13, wherein the control module waits for a testing delay period after detecting the fault condition prior to operating the switching element to allow the subsequent current flow.

16. The fault protection device of claim 15, wherein a duration of the testing delay period is greater than a duration of the transition period.

17. The fault protection device of claim 13, wherein the first fault detection threshold comprises a normal time-current characteristic curve and the testing fault detection threshold comprises a testing time-current characteristic curve.

18. The fault protection device of claim 13, wherein the testing fault detection threshold is more sensitive than the first fault detection threshold.

19. The fault protection device of claim 13, wherein the control module operates the switching element to allow a temporary current flow, verifies an absence of the fault condition based at least in part on a measurement of the temporary current flow obtained via the current sensing arrangement, and operates the switching element to enable the subsequent current flow after verifying the absence of the fault condition.

20. A method of reclosing a switching element of a fault protection device after fault detection, the method comprising:
generating a temporary current flow pulse through the fault protection device;
verifying an absence of a fault condition based at least in part on the temporary current flow using a testing fault detection threshold;
after verifying the absence of the fault condition;
closing the switching element to enable current flow through the fault protection device;
monitoring the current flow through the fault protection device for the fault condition using the testing fault detection threshold for a transition period; and
monitoring the current flow through the fault protection device for the fault condition using a different fault detection threshold after the transition period.

21. The method of claim 20, the different fault detection threshold comprising an initial fault detection threshold, wherein generating the temporary current flow pulse comprises pulsing the switching element closed after a testing delay period after opening the switching element in response to detecting the fault condition using the initial fault detection threshold.

22. The method of claim 21, wherein a duration of the testing delay period is greater than a duration of the transition period.

23. The method of claim 20, wherein the different fault detection threshold comprises a normal time-current characteristic curve and the testing fault detection threshold comprises a testing time-current characteristic curve.

24. The method of claim 20, wherein the testing fault detection threshold is more sensitive than the different fault detection threshold.

25. An electrical distribution system comprising:
a first fault protection device coupled to a portion of an electrical grid; and
a second fault protection device coupled to the portion of the electrical grid, the first fault protection device and the second fault protection device disabling current flow in response to detecting a fault condition on the electrical grid using a first fault detection threshold, wherein while the second fault protection device is open, the first fault protection device is configured to allow a temporary current flow through the first fault protection device to test for the fault condition, verify an absence of the fault condition based at least in part on the temporary current flow and a testing fault detection threshold, enable a subsequent current flow through the first fault protection device in response to verifying the absence of the fault condition, and monitor the subsequent current flow using the testing fault detection threshold during a transition period prior to the second fault protection device allowing a second temporary current flow through the second fault protection device to test for the fault condition.

26. The electrical distribution system of claim 25, wherein the first fault protection device reverts to monitoring the subsequent current flow using the first fault detection threshold prior to the second fault protection device allowing the second temporary current flow.

* * * * *